US007818652B2

(12) United States Patent
Sakata (10) Patent No.: US 7,818,652 B2
(45) Date of Patent: Oct. 19, 2010

(54) IMAGE FORMING SYSTEM, IMAGE PROCESSING APPARATUS, DETERMINATION DEVICE, AND IMAGE PROCESSING METHOD (75) Inventor: Katuaki Sakata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 658 days.

(21) Appl. No.: 11/845,405

(22) Filed: Aug. 27, 2007

(65) Prior Publication Data
US 2008/0222462 A1   Sep. 11, 2008

(30) Foreign Application Priority Data
Dec. 15, 2006   (JP)   .............. 2006-338097

(51) Int. Cl.
*H03M 13/00*   (2006.01)
(52) U.S. Cl. ...................... 714/774; 714/704
(58) Field of Classification Search ................. 714/774, 714/704
See application file for complete search history.

(56) References Cited

U.S. PATENT DOCUMENTS

| 5,381,422 | A  | * | 1/1995 | Shimizu ...................... 714/755 |
| 5,699,365 | A  | * | 12/1997 | Klayman et al. ............. 714/708 |
| 5,729,282 | A  |  | 3/1998 | Okawa ......................... 348/13 |
| 5,841,794 | A  | * | 11/1998 | Inoue et al. .................. 714/755 |
| 6,233,708 | B1 | * | 5/2001 | Hindelang et al. ........... 714/747 |
| 6,430,724 | B1 | * | 8/2002 | Laneman et al. ............ 714/780 |
| 6,542,622 | B1 |  | 4/2003 | Nelson et al. ................ 382/112 |
| 6,681,365 | B1 | * | 1/2004 | Anand et al. ................. 714/790 |
| 2001/0037485 | A1 | * | 11/2001 | Zhang ......................... 714/790 |
| 2003/0005385 | A1 | * | 1/2003 | Stieger ....................... 714/758 |
| 2003/0174208 | A1 | * | 9/2003 | Glukhovsky et al. ........ 348/131 |
| 2004/0120544 | A1 |  | 6/2004 | Eguchi et al. ................ 382/100 |
| 2005/0288595 | A1 | * | 12/2005 | Bettesh ....................... 600/478 |
| 2007/0201099 | A1 |  | 8/2007 | Eguchi et al. ............. 358/3.28 |

FOREIGN PATENT DOCUMENTS

| JP | 8-172565 | 7/1996 |
| JP | 10-107993 | 4/1998 |
| JP | 2001-121792 | 5/2001 |
| JP | 2004-104494 | 4/2004 |
| JP | 2006-166201 | 6/2006 |

* cited by examiner

*Primary Examiner*—M. Mujtaba K Chaudry
(74) *Attorney, Agent, or Firm*—Fitzpatrick, Cella, Harper & Scinto (57) ABSTRACT An object of the present invention is to provide an image forming system, an image processing apparatus, a determination device, and image processing method that are capable of preventing users' convenience from reducing even when an image forming apparatus prints a coded image with a low print precision. A first MFP is connected through a LAN to a second MFP for performing error-correcting coding of original information, for creating a coded image by imaging the original information with the error-correcting code, and for forming the created coded image on a sheet. The first MFP extracts the original information from the coded image on the sheet obtained by reading the sheet on which the coded image is formed. Thereafter, the first MFP transmits to the second MFP an error detection rate at the time when the original information is extracted.

7 Claims, 10 Drawing Sheets

IMAGE FORMING SYSTEM, IMAGE PROCESSING APPARATUS, DETERMINATION DEVICE, AND IMAGE PROCESSING METHOD

BACKGROUND OF THE INVENTION

1. Field of the Invention

The present invention relates to an image forming system, an image processing apparatus, a determination device, and an image processing method. More specifically, the present invention relates to an image forming system, an image processing apparatus, a determination device and an image processing method for performing error-correcting coding of an information source by using an error-correcting code.

2. Description of the Related Art

In response to users' growing awareness of security or for the purpose of improving users' convenience, coded images (such as digital watermark images and two-dimensional barcode images) synthesized with an original image are more frequently printed by using a multifunction printer (MFP). As a two-dimensional barcode image, for example, a QR code is well-known.

In order to ensure that original information can be eventually extracted from a coded image, in practice, an error-correcting code is added to the original information to obtain information with the error-correcting code, and thereafter the information with the error-correcting code is imaged to be the coded image. Note that, in the present specification, "to add an error-correcting code to original information" is referred to as "to perform error-correcting coding." In addition, "to add an error-correcting code to obtain information with the error-correcting code and thereafter to create an image from the information with the error-correcting code" is referred to as "to create a coded image."

In this manner, an error-correcting code is added to the original information, so that even if a coded image on a printed material is damaged (for example, stained), the original information can be extracted from the damaged coded image on the printed material.

Here, the description will be given of the error-correcting code by taking as an example a QR code which is one of the standards for two-dimensional barcodes being one example of coded images.

The error-correcting code included in the QR code is a Reed-Solomon code. Regarding the Reed-Solomon code, an error-correcting rate is found by calculating the following formula: (½)×(the information amount of original information)÷(the information amount of the original information+the amount of the error-correcting code). Accordingly, in the Reed-Solomon code, the error-correcting rate is set to 25% when the information amount of original information is equal to the amount of error-correcting code (an error-correcting code amount).

Incidentally, the error-correcting rate of 25% means that the original information can be correctly extracted even if 25% of the QR code is damaged. However, the size of the QR code with the error-correcting rate of 25% is doubled when compared with the size of the QR code with the error-correcting rate of 0% (a coded image without having the error-correcting code added to the original information).

In other words, the original information can be obtained more correctly, even when the QR code is damaged, as the error-correcting rate increases. This is an advantageous feature of the Reed-Solomon code. Meanwhile, a disadvantageous feature thereof is that the size of the QR code becomes larger as the error-correcting rate increases. For this reason, the percentage of the error-correcting code amount is generally determined in consideration of the balance between the above-mentioned advantageous and disadvantageous features.

Regarding the QR code, there are four levels of the error-correcting level as shown in Table 1.

TABLE 1

| Error-correcting level | Error-correcting rate |
|---|---|
| L | 7% |
| M | 15% |
| Q | 25% |
| H | 30% |

Referring to Table 1, the error-correcting level in the above-described example is categorized as level Q.

In addition, it is disclosed in Japanese Patent Laid-Open No. 2004-104494 that a digital watermark is embedded according to a first parameter with regard to resistance of an image and a second parameter with regard to an image quality in order to force the digital watermark to be embedded, when the information amount falls short at the time of the embedding.

According to Japanese Patent Laid-Open No. 2004-104494, when the digital watermark is forced to be embedded, it is determined whether or not all information of the inputted digital watermark is embedded. In a case where all the information is not embedded, the first parameter and/or the second parameter is changed to deteriorate resistance of the image and/or the image quality. With this, when the amount of the information that a user wants to embed is large, all the information can be embedded by reducing at least one of the image quality and the resistance. For example, in a case where the second parameter relates to the error-correcting code amount, the amount of information to be embedded can be increased by reducing this code amount.

When a printer prints a coded image with a high error-correcting rate, the largeness of the coded image printed on a printed material by the printer has been considered as a problem in the conventional cases. To solve this problem, a coded image with a relatively low error-correcting rate is printed by the printer.

However, when the printer prints such a coded image with a low error-correcting rate, there is a problem that original information cannot be extracted from the coded image printed on the printed material by the printer. This often occurs, for example, when the print precision of the printer is low.

It should be noted that, in the present specification, an event in which original information fails to be extracted from the coded image is referred to as an occurrence of an extraction error.

SUMMARY OF THE INVENTION

It is an object of the present invention to provide an image forming system, an image processing apparatus, a determination device, and an image processing method, that are capable of preventing users' convenience from reducing even when an image forming apparatus prints a coded image with a low print precision.

In first aspect of the present invention, an image forming system comprises means for forming, on a sheet, a coded image created using information obtained by adding error-correcting code information based on an error-correcting rate to original information; means for reading the sheet on which the coded image is formed by the forming means; means for calculating an error detection rate when the original information is extracted from the coded image in the read image obtained by reading the sheet using the reading means; and means for changing the error-correcting rate by using the error detection rate calculated by the calculation means.

In second aspect of the present invention, an image processing apparatus is electrically connected to a printout apparatus for forming, on a sheet, a coded image created using information obtained by adding error-correcting code information based on an error-correcting rate to original information. The image processing apparatus comprises: means for extracting the original information from the coded image on the sheet, obtained by reading the sheet on which the coded image is formed, wherein the extraction means calculates an error detection rate when the original information is extracted, in order to use the error detection rate to change the error-correcting rate, on which the error-correcting code information added to the original information is based.

In third aspect of the present invention, an image processing apparatus is electrically connected to an image forming apparatus for performing error-correcting coding of original information, for making a coded image by imaging the original information with the error-correcting code, and for forming the created coded image on a sheet. The image processing apparatus comprises: means for extracting the original information from the coded image on the sheet obtained by reading the sheet on which the coded image is formed; and means for transmitting to the image forming apparatus an error detection rate at the time when the original information is extracted by the extraction means.

In fourth aspect of the present invention, an image processing apparatus is electrically connected to an image forming apparatus, for performing error-correcting coding of original information, for making a coded image by imaging the original information with the error-correcting code, and for forming the created coded image on a sheet. The image processing apparatus comprises: means for extracting the original information from the coded image on the sheet obtained by reading the sheet on which the coded image is formed; and means for transmitting to a device an error detection rate at the time when the original information is extracted by the extraction means, the device determining an error-correcting rate to be used when the image forming performs error-correcting coding.

In fifth aspect of the present invention, a determination device determines an error-correcting rate to be used when an image forming apparatus performs error-correcting coding, the image forming apparatus performing error-correcting coding of original information, creating a coded image by imaging the original information with the error-correcting code, and forming the created coded image on a sheet. The determination device comprises: change means for changing the error-correcting rate, to be used when the image forming apparatus performs the error-correcting coding, by using the error detection rate obtained when the original information is extracted from the sheet on which the coded image is formed.

In sixth aspect of the present invention, an image processing method comprises the steps of: forming, on a sheet, a coded image created using information obtained by adding error-correcting code information based on an error-correcting rate to original information; reading the sheet on which the coded image is formed in the forming step; calculating an error detection rate when the original information is extracted from the coded image on the read image obtained by reading the sheet in the reading step; and changing the error-correcting rate by using the error detection rate calculated in the calculating step.

In seventh aspect of the present invention, an image processing method is performed by an image processing apparatus electrically connected to a printout apparatus for forming, on a sheet, a coded image created using information obtained by adding error-correcting code information based on an error-correcting rate to original information. The image processing method comprises the step of: extracting the original information from the coded image on the sheet obtained by reading the sheet on which the coded image is formed, wherein in the extracting step, an error detection rate is calculated when the original information is extracted in order to use the error detection rate to change the error-correcting rate on which the error-correcting code information added to the original information is based.

In eighth aspect of the present invention, an image processing method is performed by an image processing apparatus electrically connected to an image forming apparatus, for performing error-correcting coding of original information, for making a coded image by imaging the original information with the error-correcting code, and for forming the created coded image on a sheet. The image processing method comprises the steps of: extracting the original information from the coded image on the sheet, which is obtained by reading the sheet on which the coded image is formed; and transmitting to the image forming apparatus the error detection rate at the time when the original information is extracted in the extracting step.

In ninth aspect of the present invention, an image processing method is performed by an image processing apparatus electrically connected to an image forming apparatus, for performing error-correcting coding of original information, for making a coded image by imaging the original information with the error-correcting code, and for forming the created coded image on a sheet. The image processing method comprises the steps of: extracting the original information from the coded image on the sheet obtained by reading the sheet on which the coded image is formed; and transmitting an error detection rate at the time when the original information is extracted in the extracting step to a device for determining an error-correcting rate used when the image forming apparatus performs the error-correcting coding.

According to the present invention, even when the print precision of the image forming apparatus for printing the coded image is low, the user convenience does not need to be reduced.

Further features of the present invention will become apparent from the following description of exemplary embodiments (with reference to the attached drawings).

DESCRIPTION OF THE EMBODIMENTS

Embodiments of the present invention will be described in detail by referring to the drawings.

Prior to describing each of the embodiments, terms to be used in the present embodiment will be explained.

To add an error-correcting code to original information is referred to as error-correcting coding of original information.

In addition, when an error-correcting code is added to original information, information with the error-correcting code is obtained.

Then, this information with the error-correcting code is made into an image, so that a coded image such as a barcode (including a two-dimensional barcode), an digital watermark, and a steganography can be obtained.

This error-correcting coding and the image creation are together referred to as coded image creation. In other words, when original information is subjected to the coded image creation, a coded image including an error-correcting code is obtained.

In addition, to convert the coded image into information comprising 0 and 1 is referred to as computerization. In general, (when the coded image is not damaged), the information obtained by computerizing the coded image agrees with the above-described information with the error-correcting code.

Furthermore, to obtain the original information from the information obtained by the above-described computerization is referred to as fetching of the original information from the information obtained by the computerization.

To obtain the original information from the coded image, the computerization and fetching are performed, which together referred to as extraction.

First Embodiment

Figure 1:
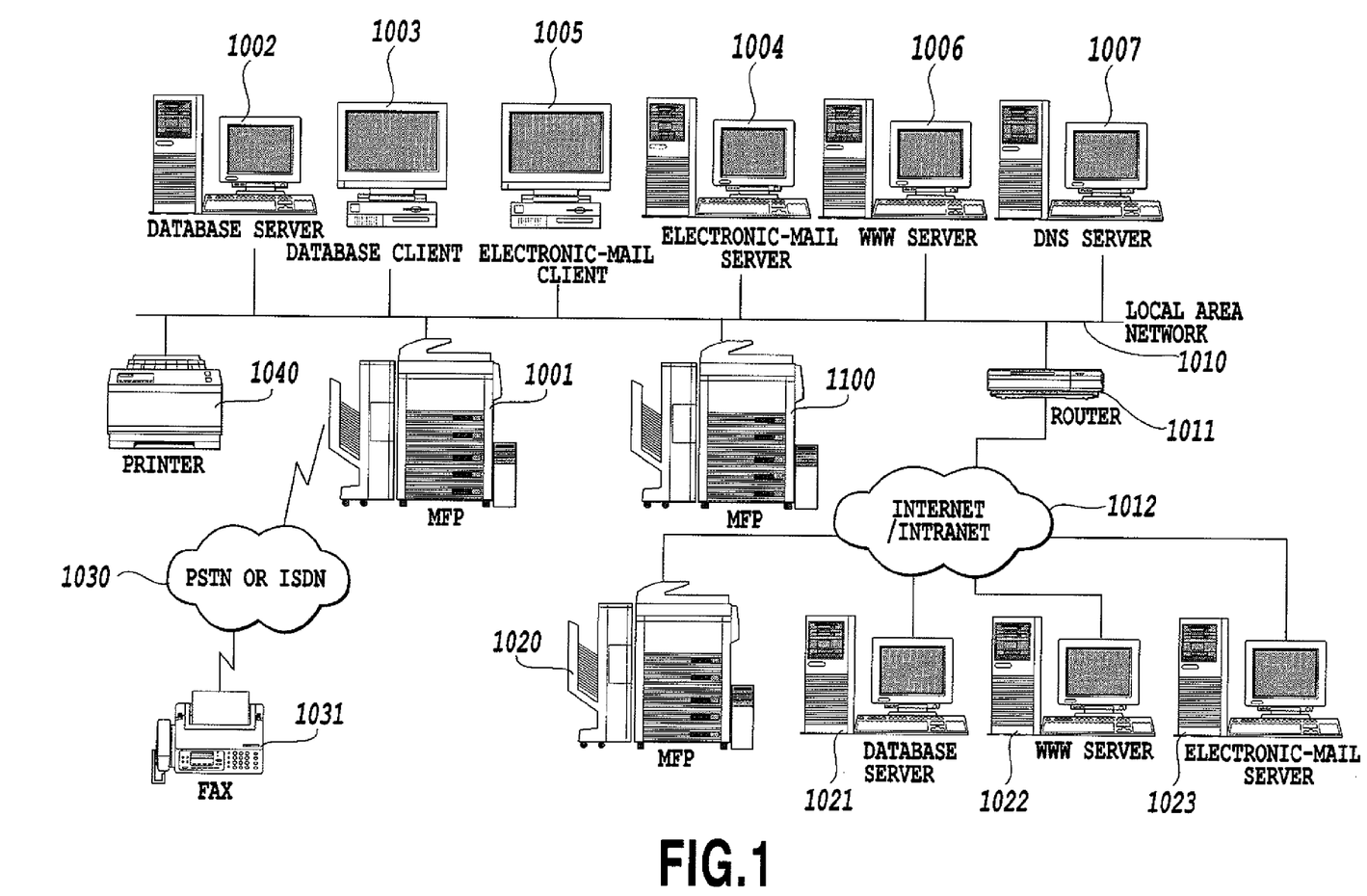
FIG. 1 is a configuration diagram of an entire network system according to one embodiment of the present invention.

FIG. 1 is a configuration diagram of an entire network system according to the present embodiment. Reference numeral 1001 is an MFP according to the present embodiment, which is provided with a scanner and a printer. The MFP 1001 can pass on an image read by using the scanner to a LAN 1010, and can perform printout of an image received from the LAN 1010 by using the printer (to form an image on a sheet). In other words, the MFP 1001 can function as image reading means, and also as an image forming apparatus.

In addition, the MFP 1001 can transmit an image read by using the scanner to any one of PSTN and ISDN 1030 with FAX transmission means, and can also perform printout of the image received from any one of the PSTN and ISDN 1030 by using the printer.

Reference numeral 1002 is a database server managing binary images and multivalued images, which are read by the MFP 1001, as databases. Reference numeral 1003 is a database client of the database server 1002, which can browse, retrieve, or the like, images saved in the database in the database server 1002. Reference numeral 1004 is an electronic mail server, which can receive the image read by the MFP 1001 as an attachment of an electronic mail. Reference numeral 1005 is a client of the electronic mail server 1004, which can receive an electronic mail received at the electronic mail server 1004 for browsing, and which can send an electronic mail.

Reference numeral 1006 is a WWW server proving LAN 1010 with an HTML document, and the HTML document provided by the WWW server can be printed out by using the MFP 1001. Reference numeral 1007 is a DNS server. Reference numeral 1011 is a router to connect the LAN 1010 to the Internet/Intranet 1012. Apparatuses similar to the database server 1002, the WWW server 1006, the electronic mail server 1004, and the MFP 1001 are connected to the Internet/Intranet 1012 as apparatuses 1021, 1022, 1023, and 1020, respectively. On the other hand, the MFP 1001 can send and receive an image by use of a FAX apparatus 1031 through any one of the PSTN and ISDN 1030. In addition, a printer 1040 is also connected to the LAN 1010, and with this configuration, an image read by the MFP 1001 can be printed out.

Figure 2:
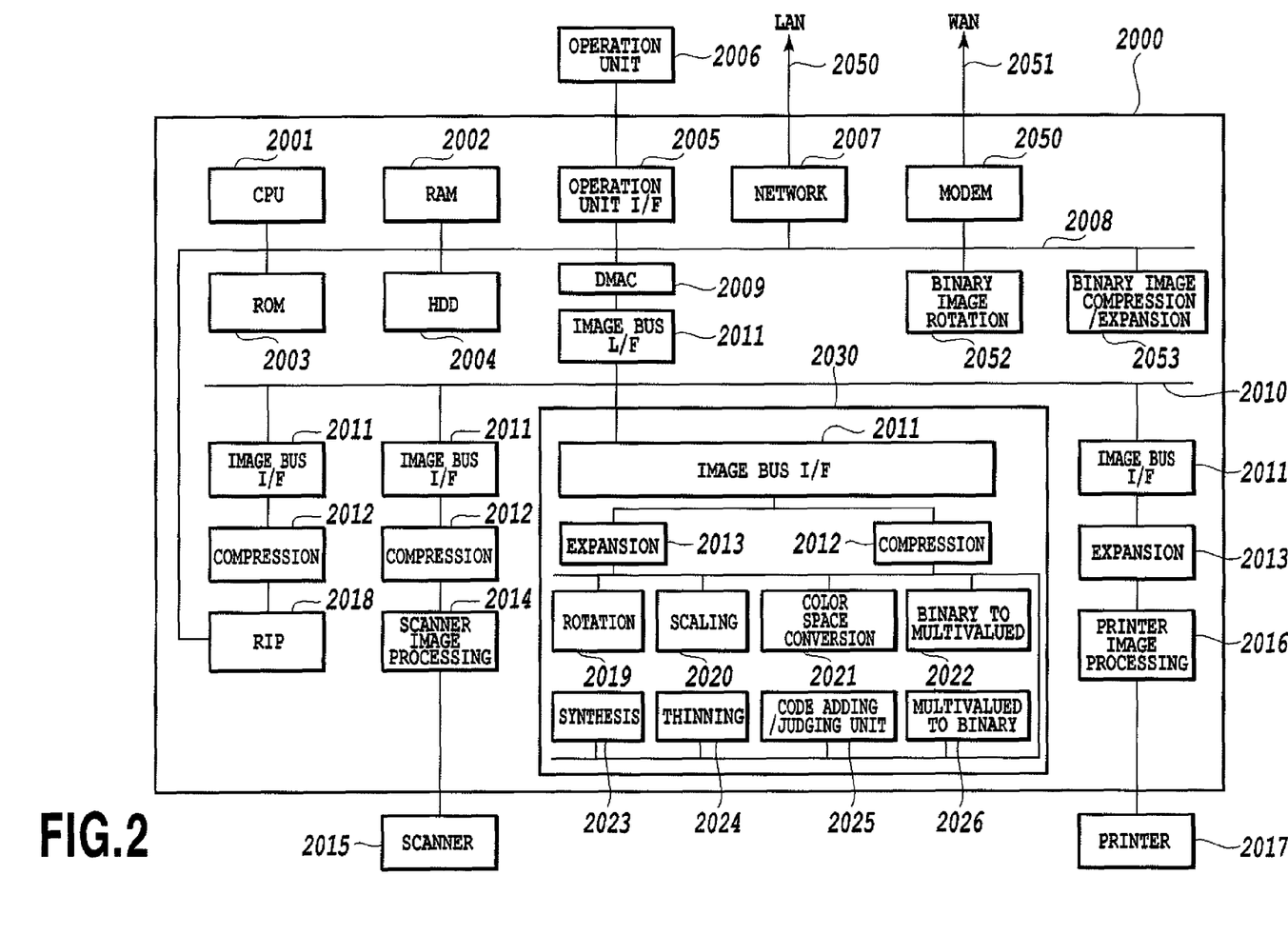
FIG. 2 is a block diagram illustrating the configuration of a multifunction system according to the embodiment of the present invention.

FIG. 2 is a block diagram illustrating a configuration of a multifunction system (such as the MFP 1001 and 1020) according to the present embodiment.

The multifunction system according to the present embodiment is provided with a controller unit 2000, an operation unit 2006, a scanner 2015, and a printer 2017. It is to be noted that the operation unit 2006 has an input operation part, including a keyboard and various switches for inputting a predetermined instruction, data, and the like, and a display part for showing various displays of the input/setup state and the like of the MFP.

The controller unit 2000 is connected to a color scanner 2015, which is an image input device, and a color printer 2017, which is an image output device or an outputting apparatus. In addition, the controller unit 2000 is a controller for performing input/output of image information and device information by being connected to a LAN 2050 and a public network (WAN) 2051. The scanner 2015 has a configuration in which a manuscript image can be read by using two kinds of light sources, each having any one of a different wavelength and a different illuminance. Here, the light sources are respectively referred to as a first light source and a second light source.

A CPU 2001 is a controller for controlling an entire system, and performs the processing operations such as various kinds of computing, control, and determination. A RAM 2002 is a system work memory for the CPU 2001 to operate, and is also an image memory for temporarily storing image data. A ROM 2003 is a boot ROM in which a boot program of the system is stored. An HDD 2004 is a hard disk drive which stores system software and image data.

An operation unit I/F 2005 is an interface for the operation unit (UI) 2006, which outputs the image data to be displayed on the operation unit 2006 to the operation unit 2006. In addition, it plays a role to transmit to the CPU 2001 the information that is inputted from the operation unit 2006 by a user of this system. A network 2007 is connected to the LAN 2050 to perform input/output of information. A modem 2050 is connected to the public network 2051 to perform input/output of image information.

A binary image rotation function 2052 and a binary image compression/expansion function 2053 are for converting a direction of an image before transmitting the binary image by the modem 2050, and for performing conversion of a resolution so as to correspond with any one of a predetermined resolution and a communication capacity of the other end. The compression and expansion functions support JBIG, MMR, MR, and MH. A DMAC 2009 is a DMA controller, which transfers an image stored in the RAM 2002 without to an image bus I/F 2011 involving the CPU 2001. In addition, the DMCA 2009 can also write an image from an image bus 2010 in the RAM 2002 without involving the CPU 2001.

The above-described devices are connected to a system bus 2008. The image bus I/F 2011 is an interface for controlling high-speed input/output of images through the image bus 2010.

A compressor 2012 is a compressor for performing JPEG compression in 32×32 pixels before transmitting an image to the image bus 2010. An expander 2013 is an expander for expanding the image transmitted through the image bus 2010.

A raster image processor (RIP) 2018 receives a PDL code from a host computer through the network 2007, and the CPU 2001 stores it in the RAM 2002 through the system bus 2008. The CPU 2001 converts the PDL into an intermediate code, and inputs the intermediate code in the RIP 2018, again through the system bus 2008. The CPU 2001 then expands the intermediate code to a bitmap image (multivalued). A scanner image processor 2014 properly performs various kinds of image processing (for example, correction, processing, and edition) for color images and black-and-white images from the scanner 2015, and performs output thereof (multivalued). Similarly, a printer image processor 2016 properly performs various kinds of image processing (for example, correction, processing, and edition) for the printer 2017. Because an expander 2013 performs binary/multivalued conversion at the time of printout, binary output and multivalued output are possible.

An image conversion unit 2030 has various kinds of image conversion functions used to perform image conversion of an image in the RAM 2002, and to perform write-back to the RAM 2002. A rotator 2019 can rotate the image in 32×32 pixels at a designated angle, and is compatible to the binary and multivalued input/output. A scaling device 2020 has functions to convert a resolution of an image (for example, from 600 dpi to 200 dpi), and to perform scaling (for example, between 25% and 400%). The image with 32×32 pixels is rearranged to be an image in 32 lines before performing the scaling.

A color space converter 2021 converts the inputted multivalued image by a matrix operation and LUT, for example from a YUV image in the memory into a Lab image, and stores the converted image in the memory. In addition, this color space conversion can perform known background dropout, and can prevent known offset by the use of the matrix operation of 3×8 and one-dimensional LUT. The converted image is outputted as a multivalued image. A binary/multivalued converter 2022 converts a binary image with 1 bit to a multivalued image with 8 bits and 256 tones. On the contrary, a multivalued/binary converter 2026 converts, for example, an image with 8 bits and 256 tones in the memory to an image with 1 bit and 2 tones with an approach such as error dispersion processing, and stores the converted image in the memory.

A synthesizer 2023 has a function to synthesize two pieces of multivalued images (or binary images) in the memory into one piece of multivalued image (or binary image). For example, a company logo and an original image in the memory are synthesized, so that the company logo can be easily added to the original image. As for a synthesizing approach, used can be known approaches, for example, meaning values for every pixel; setting a value of image having a brighter illuminance level to be a value of image after being synthesized; setting a value of image having a darker illuminance level to be a value of image after being synthesized, and the like. In addition, as the synthesizing approach, known approaches, such as an OR operation, an AND operation, and an EXCLUSIVE-OR operation, can also be used. A thinning unit 2024 is a unit that performs resolution conversion by thinning out pixels of the multivalued images, and ½, ¼, and ⅛ of the multivalued images can be outputted. By using scaling 2020 together, the thinning unit 2024 can perform enlargement and reduction in a wider range.

A code addition/determination unit 2025 synthesizes a desired coded image with a received image. The code addition/determination unit 2025 can extract original information from the coded image included in the received image. Specifically, the coded image in the received image is computerized so as to be information comprising 0 and 1, and uses the information of 0 and 1 to recover the original information.

Figure 3:
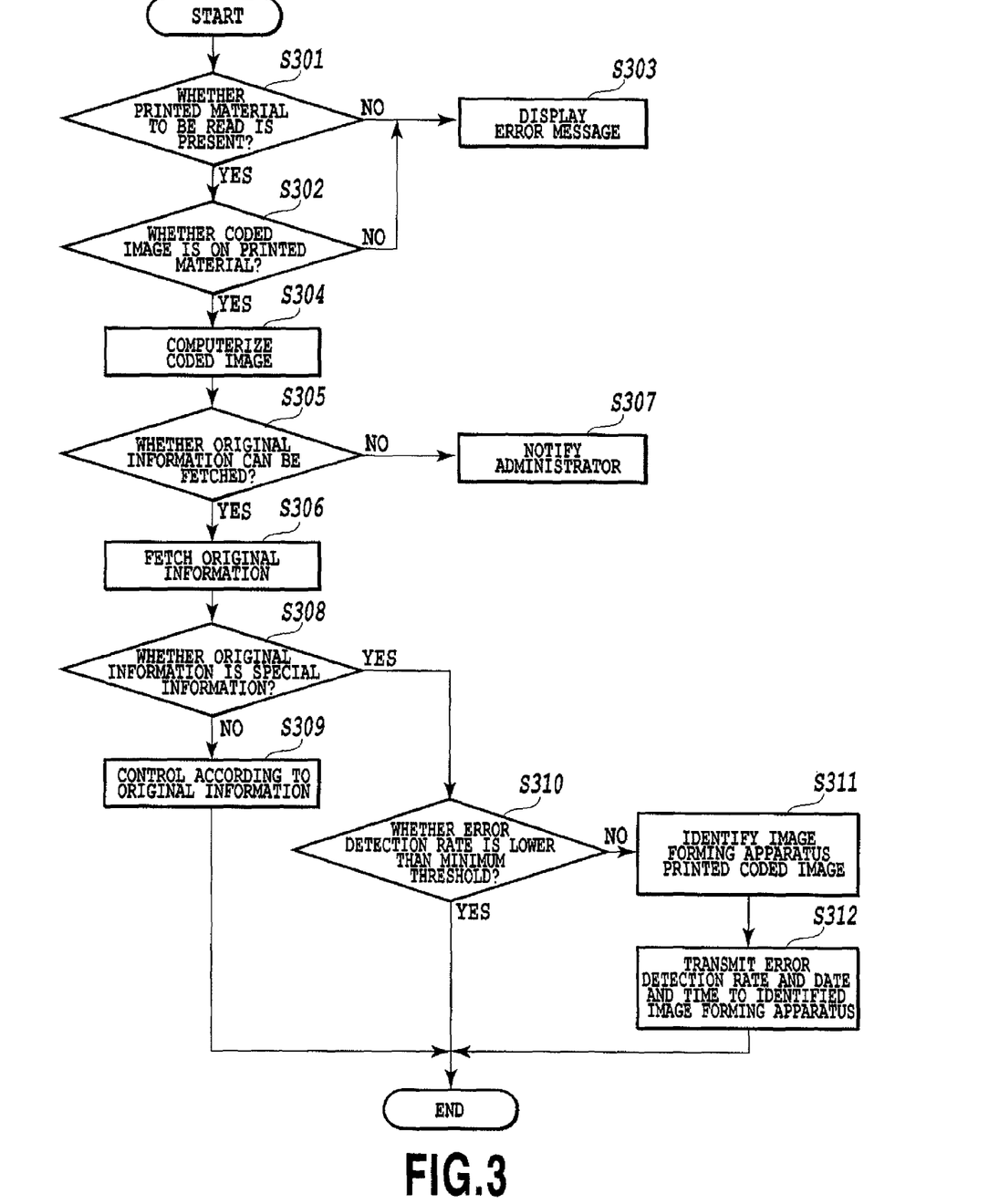
FIG. 3 is a flowchart showing the processing relating to information obtained by error-correcting coding an information source in the multifunction system, according to the embodiment of the present invention.

Next, the present embodiment will be described by using a flowchart shown in FIG. 3.

Here, the MFP 1001 adds an error-correcting code information (information based on an error-correcting rate) to the original information so as to obtain information with the error-correcting code, and a coded image is created by coding the obtained information with the error-correcting code. In other words, the coded image is created by performing the image creation using the original information. Furthermore, the MFP 1001 creates a synthesized image by synthesizing the created coded image with an original image, and forms the created synthesized image on a sheet.

It is to be noted that, in the present embodiment, there is a case where the original information includes the ID of an image forming apparatus (such as an MFP and a printer) for printing the coded image, a user ID, date and time of output, security level, information for preventing manipulation, and the like. When such information is included, in the present embodiment, the original information is referred to as special original information.

Figure 8:
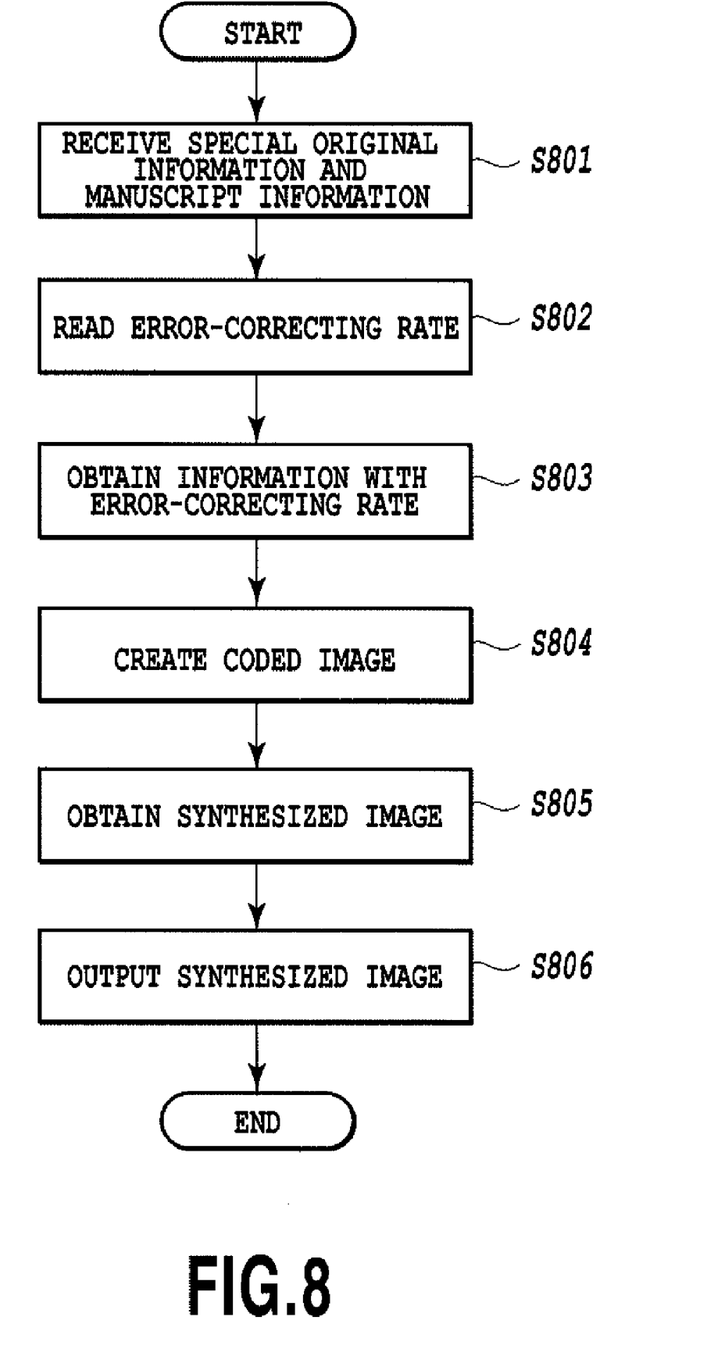
FIG. 8 is a flowchart showing the processing of synthesizing a coded image with an original image to be printed by an image forming apparatus, according to the embodiment of the present invention.

By using FIG. 8, description will be given of the flow of the processing when the MFP 1001 synthesizes a coded image with the original image and then performs printing of the synthesized image.

At step S801, the MFP 1001 receives the special original information and the original image from the host computer connected to the MFP 1001.

At step S802, the MFP 1001 reads out an error-correcting rate saved in the HDD in the MFP 1001. It is to be noted that, in this embodiment, the error-correcting rate of 7% (an error-correcting level: L) is saved in the HDD as a default. This error-correcting rate saved in the HDD is to be changed as needed. This change will be described later by using FIG. 9.

At step S803, the MFP 1001 adds an error-correcting code to the special original information based according to the error-correcting rate read out at step S802, and obtains information with the error-correcting code.

At step S804, the MFP 1001 creates a coded image by creating an image from the information with error-correcting code obtained at step S803.

At step S805, the MFP 1001 obtains a synthesized image by synthesizing the original image received from the host computer and the above-created coded image.

At step S806, the MFP 1001 outputs the synthesized image to print out the image on a sheet.

Next, by using FIG. 3, description will be given of the processing when the MFP 1100 scans a printed material.

Incidentally, it is assumed that a user has selected a coded-image reading mode, prior to scanning a printed material, through the operation unit 2006 included in the MFP 1100. The coded-image reading mode is to be used when the user wants the image reading means, such as the MFP, to read the printed material on which the coded image is printed.

At step S301, the MFP 1100 determines whether or not a printed material to be read is on a scanner table. This determination may be performed according to a detection signal detected by a sensor provided on the scanner table. When it is determined that the printed material is on the table, the MFP 1100 proceeds to step S302. On the other hand, when it is determined that the printed material is not on the table, the MFP 1100 proceeds to step S303 to display an error message on a display screen.

At step S302, the MFP 1100 determines whether or not a coded image is present on the printed material. When it is determined that the coded image is present, the step proceeds to step S304. On the other hand, when it is determined that the coded image is absent, the step proceeds to step S303 to also display an error message on the display screen.

At step S304, the MFP 1100 obtains information by computerizing the coded image.

At step S305, the MFP 1100 determines whether or not original information can be taken out from the information obtained at step S304 by using an error-correcting code included in the information obtained at step S304. In addition, at this time, an error detection rate of the original information is calculated. In the present embodiment, as will be described later, the error-correcting rate included in the error-correcting code information added to the original information (an error-correcting code of the image forming apparatus outputting the original information) can be changed. The calculation of the error detection rate of the original information is for performing this change.

It is to be noted that, in the present embodiment, "error detection rate" shows the percentage of a damaged area of the coded image. In addition, this percentage of the area means the percentage of the amount of information, included in the information amount of the original information, which needs to be corrected by the error-correcting code.

Accordingly, for example, when the error detection rate is 4%, the percentage of the damaged area of the coded image is 4%.

In a case where the error detection rate is 4%, when the original information is extracted from the coded image with the error-correcting rate of 7%, the original information is managed to be extracted from the coded image. However, in a case where the error detection rate exceeds 7%, when the original information is extracted from the coded image with the error-correcting rate of 7%, the original information cannot be correctly extracted from the coded image, which results in generating a read error.

At step S305, when it is determined that the original information can be fetched, the MFP 1100 proceeds to step S306, and then proceeds to step S308 after fetching the original information from the information obtained at step S304. On the other hand, at step S305, when it is determined that the original information cannot be fetched, the step proceeds to step S307 to display a read error on the display screen and to send notification to an administrator.

At step S308, the MFP 1100 determines whether or not the original information obtained at step S306 is special original information. In other words, it is determined whether or not the extracted original information includes the ID of an image forming apparatus (such as MFP and printer) for printing the coded image, a user ID, date and time of output (printing date and time), security level, information for preventing manipulation, and the like. When it is determined that the above-mentioned information is not included, as a result of the determination, the step proceeds to step S309 to perform control according to the original information. On the other hand, when the information is included, the step proceeds to step S310.

At step S310, the MFP 1100 determines whether the error detection rate calculated at step S305 is lower than a minimum threshold (in the present embodiment, the minimum threshold is set to 5%) or is the minimum threshold or higher. When the rate is lower than the minimum threshold, the processing is terminated.

On the other hand, when the error detection rate is the minimum threshold or higher, the step proceeds to step S311.

The reason why the processing is terminated, as mentioned above, when the error detection rate is lower than the minimum threshold at step S310 is that the degree of the damage of the coded image is extremely small, and there is no need to do any processing.

In addition, the reason why the step proceeds to step S311 when the rate is the minimum threshold or higher at step S310 is that the degree of the damage of the coded image is large, and thus a print precision of the printer which created the printed material including the coded image is a concern.

Figure 4:
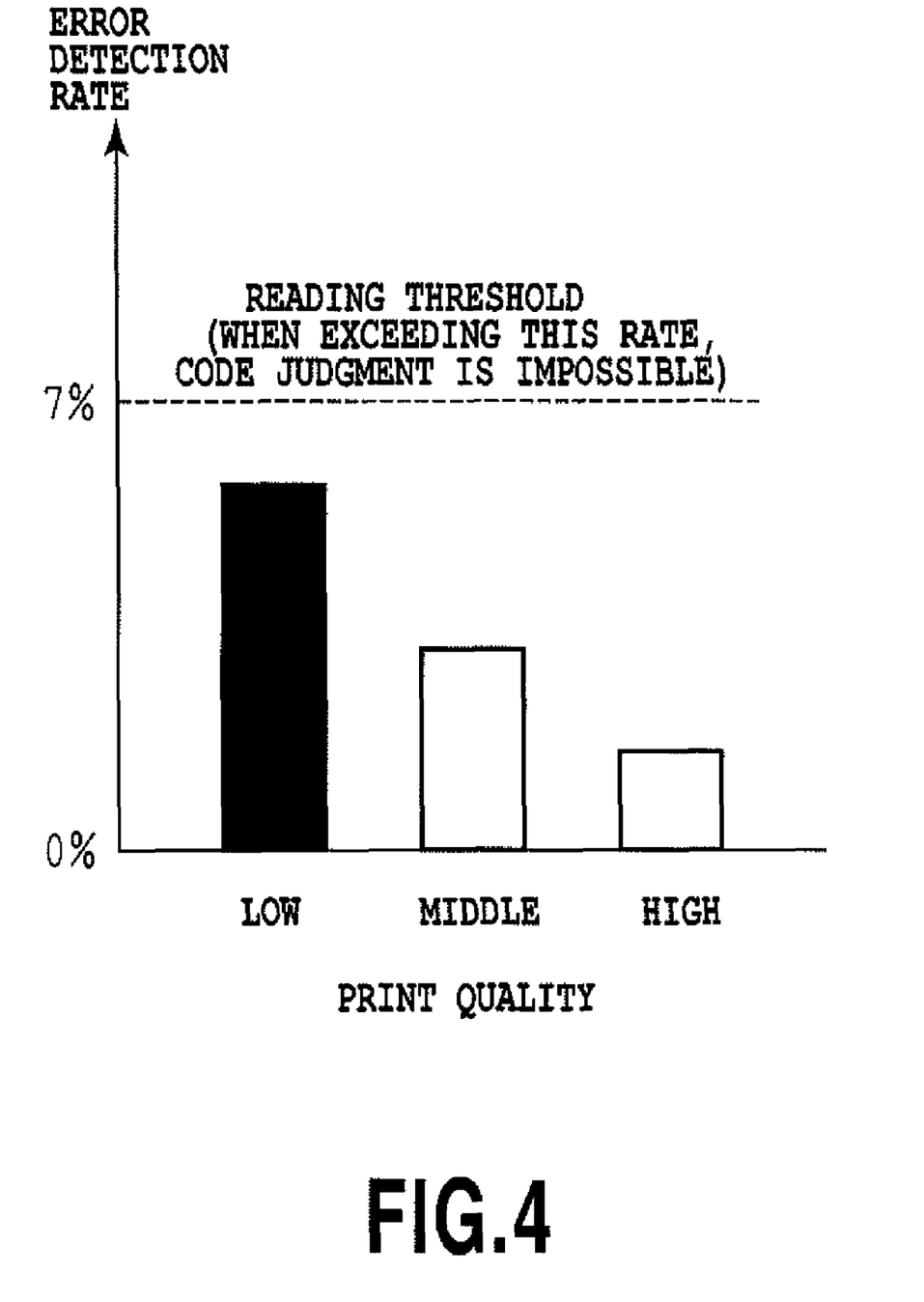
FIG. 4 is a graph showing relationships between the print quality and the error rate, according to the embodiment of the present invention.

FIG. 4 is a graph showing a relationship between a print precision of the printer creating the printed material including the coded image and an error detection rate calculated by the MFP which scanned the printed material. In FIG. 4, the horizontal axis shows the print precision of the printer (MFP 1001) creating the printed material including the coded image, while the vertical axis shows an error detection rate calculated by the MFP which scanned the printed material.

It is to be noted that the error detection rate does not always has the same relationship with the print precision, but also depends on other factors, such as a stain on the coded image on the printed material. However, in FIG. 4, shown is the relationship between the print precision of the printer which created the printed material and the error detection rate calculated by the MFP which scanned the printed material on condition that there is no other factors than the print precision.

At step S311, the MFP 1100 identifies an image forming apparatus (for example, a printer) which printed the coded image, from the image forming apparatus ID included in the original information obtained at S305. In the present embodiment, because the image forming apparatus ID is the ID of the MFP 1001, the MFP 1100 identifies that the image forming apparatus which printed the coded image is the MFP 1001.

At step S312, the MFP 1100 transmits the error detection rate and the printing date and time (the printing date and time being the information extracted from the coded image) to the image forming apparatus (MFP 1001) specified as the image forming apparatus which printed the coded image at step S309.

Figure 9:
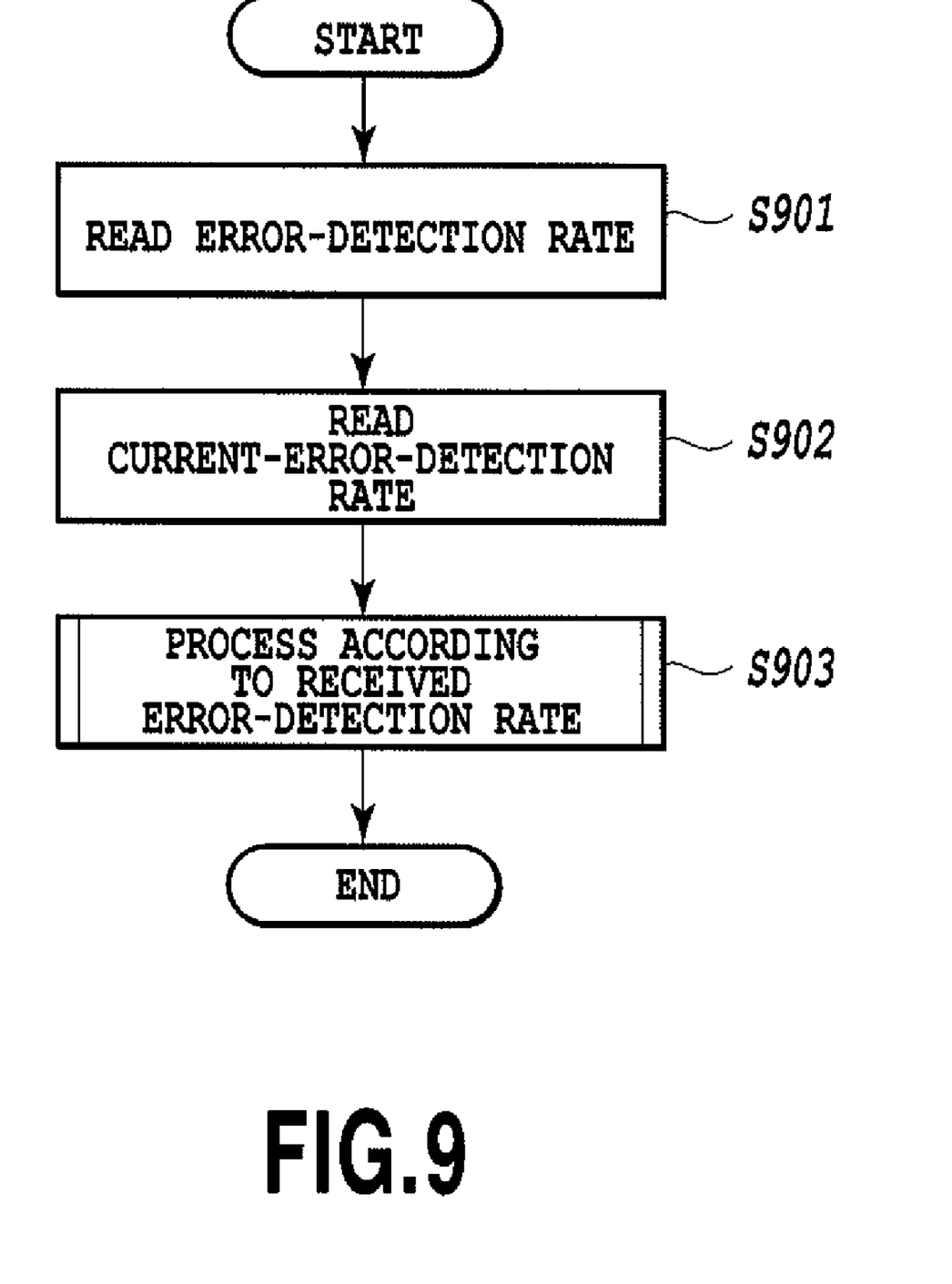
FIG. 9 is a flowchart showing the processing of the image forming apparatus, receiving an error detection rate and printing date and time, according to the embodiment of the present invention.

In the present embodiment, the image forming apparatus which received such an error detection rate performs processing shown in FIG. 9 (changing the error-correcting rate, sending notification to the administrator, standing by, and the like).

To send notification to the administrator means, in the present embodiment, that a mail showing an error state is sent to a mail address which is registered as the address of the administrator administrating the image forming apparatus which received the error detection rate.

Next, by using FIG. 9, the processing performed by the MFP 1001 when the error detection rate and the printing data and time are received from the MFP 1100, will be described.

At step S901, the MFP 1001 receives the error detection rate and the printing date and time from the MFP 1100.

At step S902, the MFP 1001 reads out the error-correcting rate currently saved on the HDD.

At step S903, the MFP 1001 determines, from the error detection rate received at step S901, whether to change the error-correcting rate saved on the HDD in the MFP 1001, to send notification to the administrator, or to standby without doing anything. Then, the processing is performed according to the determination result. The processing at step S903 will be described by using FIG. 10.

Figure 10:
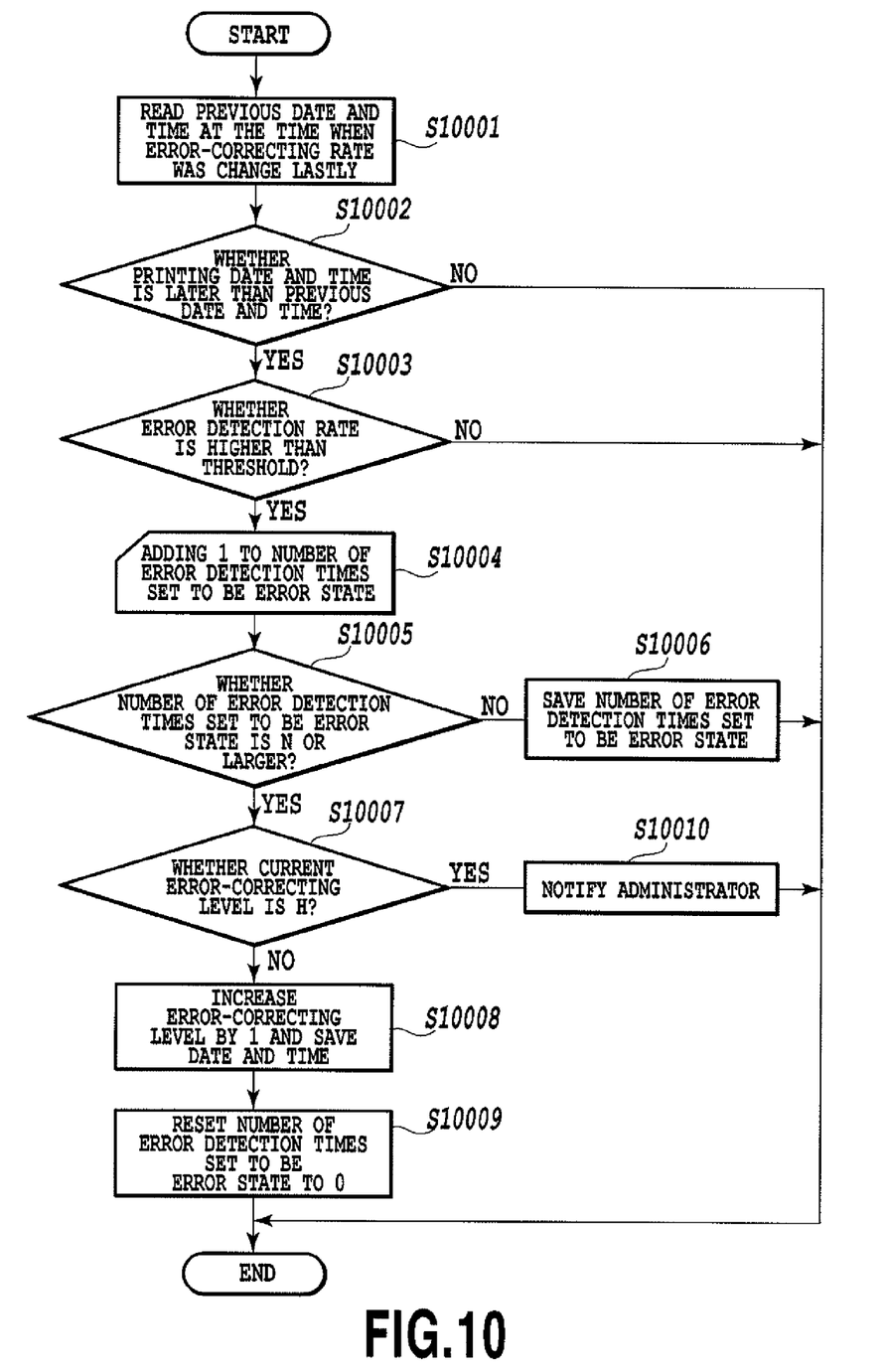
FIG. 10 is a flowchart showing the processing at step S903 of FIG. 9.

Next, by using FIG. 10, the processing at step S903 will be descried.

At step S10001, the MFP 1001 reads out the previous date and time at the time when the error-correcting rate was changed lastly from the HDD. It is to be noted that it is assumed that the previous date and time at the time when the error-correcting rate was changed lastly have been saved on the HDD in advance.

At step S10002, the MFP 1001 compares the previous date and time with the printing date and time received at step S901. When the previous date and time are prior to the printing date and time, the step proceeds to step S10003. When the printing date and time are prior to the previous date and time, the processing is terminated.

At step S10002 in the present embodiment, the above-described processing is performed so that only the error detection rate obtained from the printed material printed after the previous date and time at the time when the error-correcting rate was changed lastly can be set to a target of the processing at step S10003.

At step S10003, the MFP 1001 determines whether or not the error detection rate is higher than the threshold determined according to the current error-correcting rate. When it is determined that the error detection rate is higher, the step proceeds to step S10004, while when the error detection rate is lower, the processing is terminated. It is to be noted that, in the present embodiment, the current error-correcting rate× 80% is set to the threshold.

As describer above, only when the error detection rate is the current error-correcting rate×80% or higher, the step proceeds to step S10004.

When it is lower than the current error-correcting rate× 80%, the original information can be sufficiently extracted from the error-correcting code image. Hence, the processing can be terminated without performing the processing for changing the error-correcting code.

Figure 6:
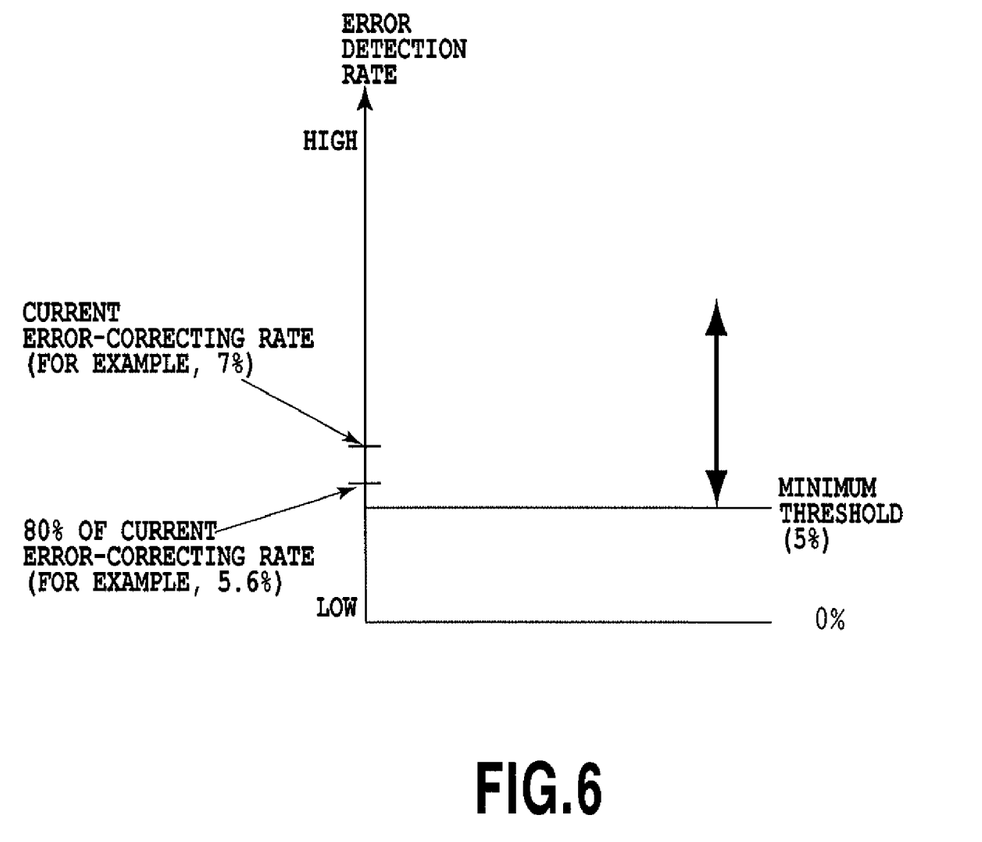
FIG. 6 is a graph illustrating the range of adjusting the error-correcting code amount, according to the embodiment of the present invention.

Incidentally, FIG. 6 shows that the step proceeds to step S10004 in a case where the threshold is 5.6% or higher (the error-correcting rate×80%) when the error-correcting rate is 7%.

At step S10004, the MFP 1001 adds 1 to the number of finding high error detection rate saved on the HDD. It is to be noted that the number of finding high error detection rate saved on the HDD corresponds with the number of times that the error detection rate is determined to be at the threshold or larger, the error detection rate calculated when the coded image is extracted from the printed material printed after the previous data and time at the time when the error-correcting rate was changed lastly.

At step S10005, it is determined whether or not the number of finding high error detection rate is N or larger. When it is smaller than N, the step proceeds to step S10006 to save the number of finding high error detection rate which has 1 added at step S10004, on the HDD.

At step S10007, the MFP 1001 determines whether or not the current error-correcting level is H. When the level is H, the step proceeds to step S10010, since the error-correcting level cannot be increased higher, to send notification to the administrator. The processing is then terminated.

Figure 5:
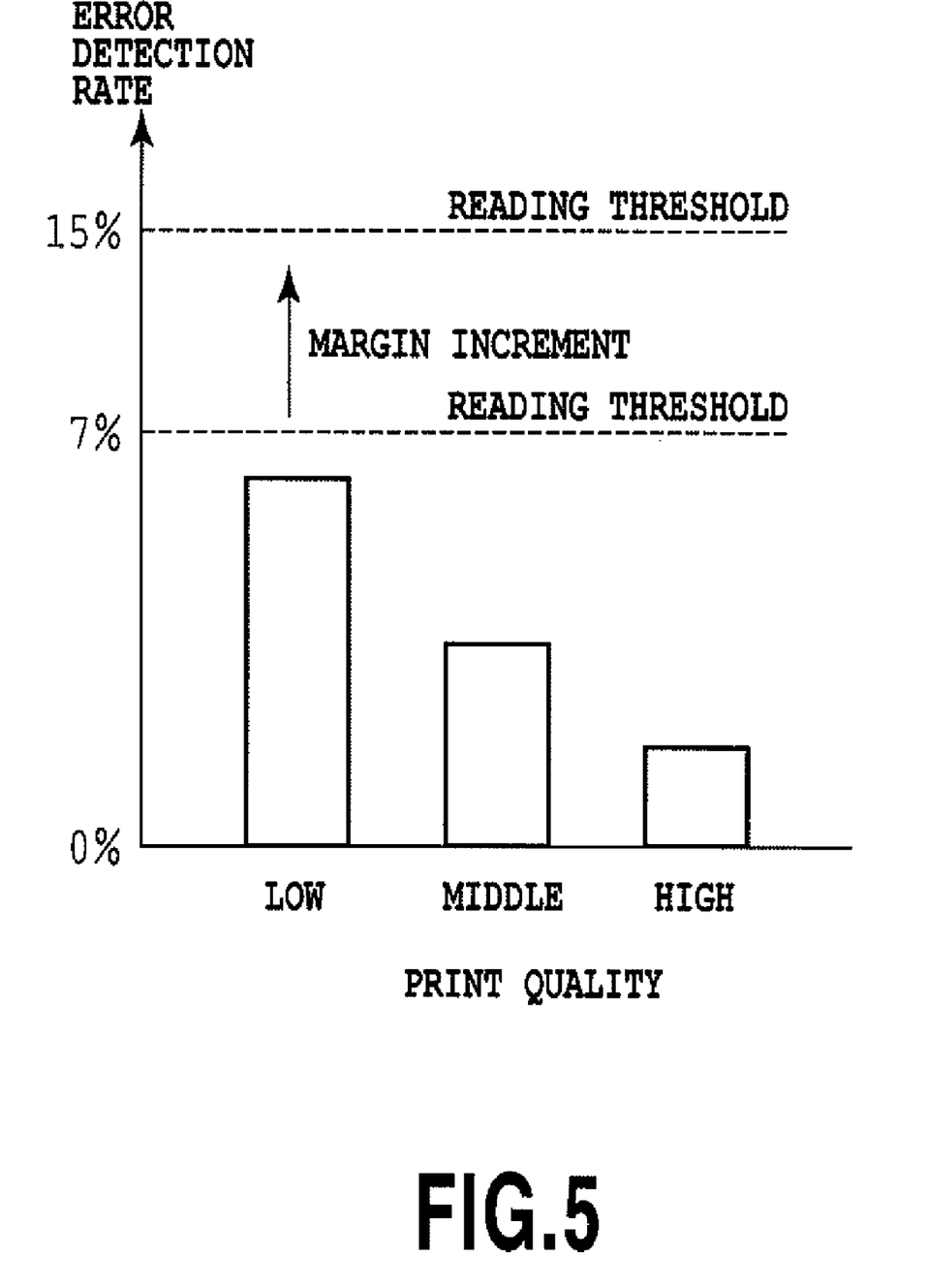
FIG. 5 is a graph showing relationships between the print quality and the error rate, according to the embodiment of the present invention.

At step S10008, the MFP 1001 increases the current error-correcting level by 1 so as to increase the error-correcting rate (the error-correcting rate is changed to be higher). Furthermore, the current date and time are saved on the HDD so that it can be used later as the previous date and time at the time when the error-correcting rate was changed lastly. For example, the error-correcting rate is increased as shown in FIG. 5.

At step S10009, the MFP 1001 resets the number of finding high error detection rate to be 0, and the processing is then terminated.

As described above, in the present embodiment, the error-correcting rate is changed according to the error detection rate obtained at the time when the original information is extracted from the ceded image on the printed image read by the scanner 2015 as the image reading means.

It is to be noted that, in the present embodiment, a user inputs an instruction to read a QR code through the operation unit 2006 so that the MFP 1100 operates in a QR-code reading mode, but the present invention is not limited to this. For example, the QR-code reading mode may not be provided. In other words, the processing described by using FIGS. 3, 8, 9, and 10 may be performed in a general scanning mode and a general copy mode.

In addition, in the present embodiment, the error detection rate is calculated using the coded image on the printed material read by the scanner of the MFP 1100 which is an apparatus different from the MFP 1001 functioning as an image forming apparatus. The MFP 1100 then changes the error-correcting rate according to the transmitted error detection rate.

In other words, the bottom line of the present invention is that the image processing apparatus determines whether or not the error detection rate is higher than the threshold, and notifies, when the rate is higher, the error detection rate to the image forming apparatus. The error detection rate is sent, before the error detection rate reaches the reading limitation (when the error detection rate reaches the reading limitation, it becomes impossible to extract the original information from the coded image), to the image forming apparatus which printed the coded image so as to send notification notifying that the processing is in an error state. Accordingly, the apparatus performing the image forming may be electrically connected to the image processing apparatus, and may also be integrated with the image processing apparatus, that is, may be included in the same apparatus as the image processing apparatus. Although the present embodiment has been described on condition that the MFP 1001 and the MFP 1100 are different apparatuses, there is a possibility that an apparatus which created the printed material including the coded image and the apparatus which scanned the printed material are included in one apparatus. In other words, the MFP 1001 and the MFP 1100 may be the same apparatus. Even when the apparatus performing image forming and the image processing apparatus are integrated, it is apparent that the apparatus performing the image forming and the image processing apparatus are electrically connected.

In addition, the present embodiment has been described on condition that the error detection rate is sent to the image forming apparatus which printed the coded image. However, the rate may be sent to an apparatus other than the image forming apparatus which printed the coded image.

For example, when a server administrates the image forming apparatus which printed the coded image, and has an authority to determine an error-correcting rate of the image forming apparatus, the error detection rate may be sent to the server. It is to be noted that, in the present specification, the apparatus that determines the error-correcting rate at the tie when the image forming apparatus performs error-correcting coding is referred to as a determination device. Although the present embodiment has been described on condition that such a determination device is the image forming apparatus per se, a determination device may not be the image forming apparatus per se, as described above.

Second Embodiment

In the first embodiment, the MFP 1100 performs reading of the coded image and information processing thereafter. In the present embodiment, the above-described information processing is performed in an external device provided with a CPU and storage means, such as a personal computer (PC).

Figure 7:
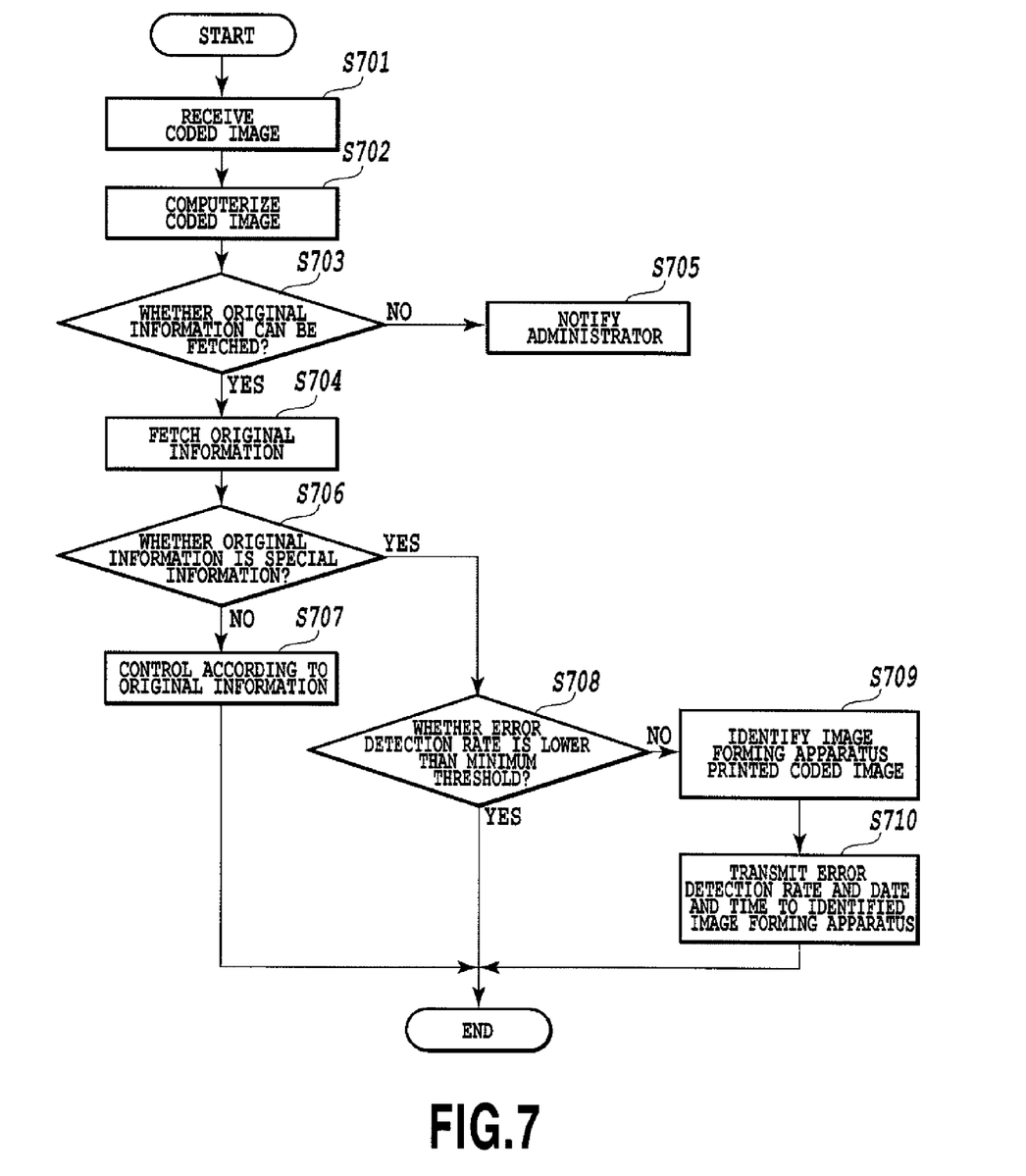
FIG. 7 is a flowchart showing the processing relating to information obtained by error-correcting coding of an information source, according to the embodiment of the present invention.

FIG. 7 is a flowchart showing the processing relating to information obtained by performing error-correcting coding of an information source, according to the present embodiment.

In the present embodiment, the sheet including a coded image outputted from the MFP 1001 is read by a scanner (not shown) different from the MFP 1001 to acquire the coded image. The coded image is transmitted to a PC connected to the scanner through a network. In this manner, the PC acquires the coded image obtained by reading the sheet on which the coded image is formed.

At step S701, the PC receives the coded image transmitted from the scanner.

At step S702, similar to step S304, PC obtains information by computerizing the coded image.

At step S703, similar to step S305, the PC determines whether or not original information can be fetched from the information obtained at step S701 by using an error-correcting code included in the information obtained at step S702. In addition, at this time, the error detection rate of the original information is calculated.

When it is determined, at step S703, that the original information can be fetched, the PC proceeds to step S704 to fetch the original information from the information obtained at step S702, and then to step S706. On the other hand, when it is determined, at step S703, that the original information cannot be fetched, the PC proceeds to step S705 to display a read error on the display screen, and to send notification to the administrator.

At step S706, the PC determines whether or not the original information obtained at step S704 is special original information. In other words, it is determined whether or not the extracted original information includes the ID of an image forming apparatus for printing the coded image (such as an MFP and a printer), a user ID, date and time of output (printing date and time), the security level, information for preventing manipulation, and the like. As a result of the determination, when the original information does not include the above-mentioned data, the step proceeds to step S707 to perform control using the original information. On the other hand, when the information includes the data, the step proceeds to step S708. At step S708, the PC determines whether the error detection rate calculated at step S703 is lower than the minimum threshold (in the present embodiment, the minimum threshold is set to 5%) or is the minimum threshold or higher. When it is lower than the minimum threshold, the processing is terminated.

Meanwhile, when the error detection rate is the minimum threshold or higher, the step proceeds to step S709.

At step S709, the PC uses the image forming apparatus ID included in the original information obtained at step S703 to identify the image forming apparatus (for example, a printer) which printed the coded image. In the present embodiment, because the image forming apparatus ID is the ID of the MFP 1001, the PC determines that the image forming apparatus which printed the coded image is the MFP 1001.

At step S710, the PC transmits the error detection rate and the printing date and time (the printing date and time which is included in the information extracted from the coded image) to the image forming apparatus (MFP 1001) identified at the step S709 as the image forming apparatus which printed the coded image. It is to be noted that the PC, according to the present embodiment, is connected to the MFP 1001 though the network.

Other Embodiment

In the scope of the above-described embodiments, also included are: a processing method for storing, on a storage medium, a program for operating the configurations of the above-described embodiments so as to implement the functions of the above-described embodiments; reading out the program stored on the storage medium as a code; and executing the program on a computer. In addition, the program itself is also included in the embodiments as well as the storage medium on which the program is stored.

As such a storage medium, used can be, for example, a floppy (registered trademark) disk, a hard disk, an optical disk, a magneto-optical disk, a CD-ROM, a magnetic tape, a non-volatile memory card, and a ROM.

In addition, the present invention is not limited to the program which performs the processing by a single program of itself stored on the storage medium. It is also included in the scope of the above-described embodiments that the operations of the above-described embodiments are performed by operating on an OS by a program in cooperation with other software and functions of an expansion board.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-338097, filed Dec. 15, 2006, which is hereby incorporated by reference herein in its entirety.

What is claimed is:

1. An image processing system including
an image formation apparatus that error-correction codes original information at a predetermined error correction rate, produces a code image by imaging the original information that was subjected to the error correction coding, and forms the produced code image on a sheet, and
an image processing apparatus equipped with extraction means for extracting the original information from the code image on the sheet that was obtained by reading the sheet with the code image formed thereon and transmission means for transmitting an error detection rate when the original information is extracted by the extraction means to the image formation apparatus wherein the image formation apparatus has:

reception means for receiving the error detection rate from the image processing apparatus;

first determination means for determining whether the received error detection rate is lower than a predetermined threshold in order to determine whether the original information has been successfully extracted from the code image;

counting means for counting the number of times at each of which the first determination means determines that the error detection rate is not lower than the predetermined threshold;

second determination means for determining whether the number of counts in the counting means is lower than the predetermined number of times;

an error correction rate alteration means for, when the second determination means determines that the number of counts is not lower than the predetermined number of times, raising the predetermined error correction rate, and when the second determination means determines that the number of counts is lower than the predetermined number of times, not raising the predetermined error correction rate; and resetting means for, when the predetermined error correction rate is raised by the error correction rate alteration means, resetting the number of counts of the counting means; and the predetermined threshold is a value obtained by multiplying the error correction rate before alteration by a predetermined ratio.

2. An image processing system including an image formation apparatus that error-correction codes original information at a predetermined error correction rate, produces a code image by imaging the original information that was subjected to the error correction coding, and forms the produced code image on a sheet, and an image processing apparatus equipped with extraction means for extracting the original information and printing time and date information from the code image on the sheet that was obtained by reading the sheet with the code image formed thereon and transmission means for transmitting an error detection rate when the original information was extracted by the extraction means and the printing time and date information to the image formation apparatus, wherein the image formation apparatus has:

reception means for receiving the error detection rate and the printing time and date information from the image processing apparatus;

saving means for saving time and date information of the last time when the predetermined error correction rate was altered;

first determination means for determining whether the received error detection rate is lower than a predetermined threshold in order to, when the received printing time and date information and the stored time and date information of the last time are compared, and if the printing time and date is later than the latter, determine whether an original image has been successfully extracted;

counting means for counting the number of times at each of which the first determination means determines that the error detection rate is not lower than the predetermined threshold;

second determination means for determining whether the number of counts in the counting means is lower than the predetermined number of times;

an error correction rate alteration means for, when the second determination means determines that the number of counts is not lower than the predetermined number of times, raising the predetermined error correction rate, and when the second determination means determines that the number of counts is lower than the predetermined number of times, not raising the predetermined error correction rate; and resetting means for, when the predetermined error correction rate is raised by the error correction rate alteration means, resetting the number of counts of the counting means; and the predetermined threshold is a value obtained by multiplying the error correction rate before the alteration by a predetermined ratio.

3. The image processing system according to claim 1, wherein, when the second determination means determines that the number of counts is not lower than the predetermined number of times, the error correction rate alteration means determines whether the predetermined error correction rate exceeds an upper limit value, and when having determined that it exceeds the upper limit value, notifies an administrator of it.

4. A control method of an image processing system including an image formation apparatus that error-correction codes original information at a predetermined error correction rate, produces a code image by imaging the original information that was subjected to the error correction coding, and forms the produced code image on a sheet, and an image processing apparatus equipped with extraction means for extracting the original information from the code image on the sheet obtained by reading the sheet with the code image formed thereon and transmission means for transmitting an error detection rate when the original information was extracted by the extraction means to the image processing apparatus, wherein the image formation apparatus includes:

a reception step of receiving the error detection rate from the image processing apparatus;

a first determination step of determining whether the received error correction rate is lower than a predetermined threshold in order to determine whether the original image has been successfully extracted from the code image;

a count step of counting the number of times at each of which it is determined that the error correction rate is not lower than the predetermined threshold in the first determination step;

a second determination step of determining whether the number of counts in the count step is lower than a predetermined number of times;

an error correction rate alteration step of, when it is determined in the second determination step that the number of counts is not lower than the predetermined number of times, raising the predetermined error correction rate, and when it is determined in the second determination step that the number of counts is lower than the predetermined number of times, not raising the predetermined error correction rate; and a reset step of, when the predetermined error correction rate is raised in the error correction rate alteration step, resetting the number of counts in the count step; and the predetermined threshold is a value obtained by multiplying the error correction rate before the alteration by a predetermined ratio.

5. A control method of an image processing system including an image formation apparatus that error-correction codes original information at a predetermined error correction rate, produces a code image by imaging the original information that was subjected to the error correction coding, and forms the produced code image on a sheet, and an image processing apparatus equipped with extraction means for extracting the original information and printing time and date information from the code image on the sheet that was obtained by reading the sheet with the code image formed thereon and transmission means for transmitting an error detection rate when the extraction means extracted the original information and the printing time and date information to the image formation apparatus, wherein the image formation apparatus includes:

a reception step of receiving the error detection rate and the printing time and date information from the image processing apparatus;

a saving step of saving time and date information of the last time when the predetermined error correction rate was altered;

a first determination step of determining whether the received error detection rate is lower than a predetermined threshold in order to determine whether the original information has been successfully extracted from the code information when the received printing time and date information and the saved time and date information of the last time were compared and if the printing time and date is later than the latter;

a count step of counting the number of times at each of which it is determined that the error detection rate is not lower than the predetermined threshold in the first determination step;

a second determination step of determining whether the number of counts in the count step is lower than a predetermined number of times;

an error correction rate alteration step of, when it is determined that the number of counts in the count step is not lower than a predetermined number of times, raising the predetermined error correction rate, and when it is determined in the second determination step that the number of counts is lower than the predetermined number of times, not raising the predetermined error correction rate; and a reset step of resetting the number of counts in the count step when the predetermined error correction rate is raised in the error correction rate alteration step; and the predetermined threshold is a value obtained by multiplying the error correction rate before the alteration by a predetermined rate.

6. The control method of the image processing apparatus according to claim 4, wherein, when it is determined in the second determination step that the number of counts is not lower than the predetermined number of times, the error correction rate alteration step determines whether the predetermined error correction rate exceeds an upper limit value, and when having determined that it exceeds the upper limit value, notifies an administrator of it.

7. A program in a computer readable medium for making a computer perform the control method of the image processing system according to any one of claims 4 to 6.

* * * * *